Sept. 8, 1959  L. H. WALKER  2,903,372
METHOD OF PROCESSING GRAPE JUICE, ETC
Filed May 31, 1956
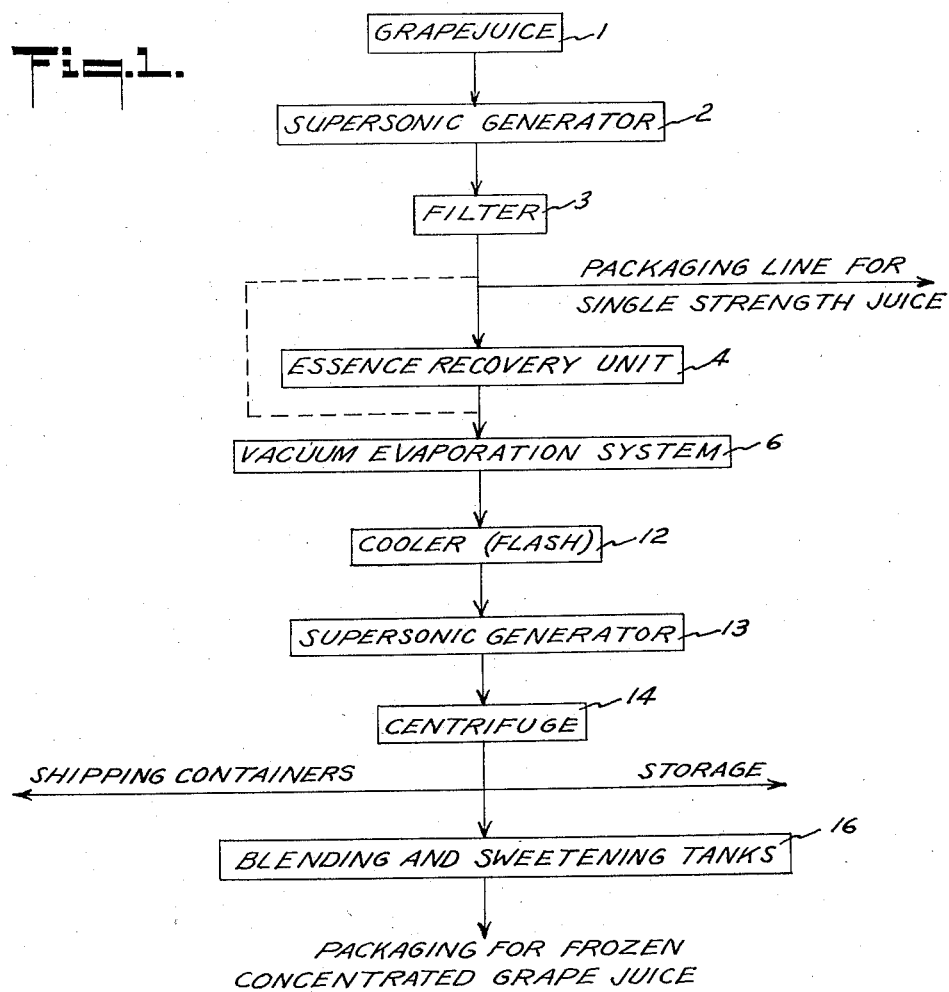
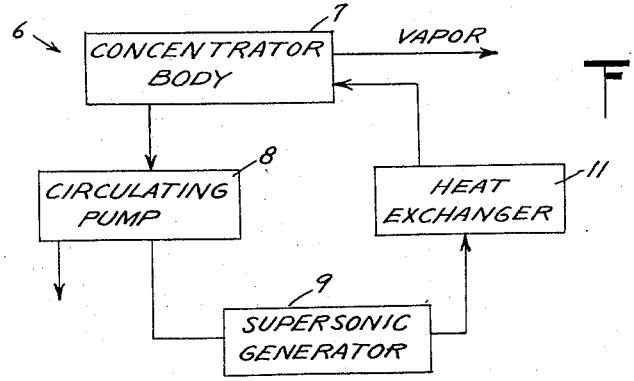
INVENTOR
LEANDER H. WALKER
BY
ATTORNEYS

United States Patent Office 2,903,372
Patented Sept. 8, 1959

2,903,372

METHOD OF PROCESSING GRAPE JUICE, ETC.

Leander H. Walker, Berkeley, Calif.

Application May 31, 1956, Serial No. 588,474

4 Claims. (Cl. 99—217)

The present invention relates generally to the removal of materials from liquids as in the reduction of supersaturated solutions to saturated solutions by crystallization and in the agglomeration of finely divided particles in suspension in liquids. More particularly, the invention is directed to rapid artificially induced crystallization and agglomeration such as to be applicable to continuous flow processes.

The invention may be best described in connection with one proven advantageous application thereof; as for example, in the processing of grape juice as hereinafter set out. The invention is applied in the removal of excess tartaric acid salts and of suspended insoluble solids from grape juice and, more particularly to a crystallization and agglomeration process whereby tartrates and other substances are rapidly and efficiently crystallized and agglomerated from juice or concentrate, thereby converting both types of substances into a physical form such that they are easily removable from the liquid by filtration, centrifugation or other similar processes.

Grapes of all strains and particularly of the Vinifera or European strains and the Labrusca or American strains, contain relatively large amounts of tartaric acid salts, predominantly potassium bitartrate. In addition, during the process of juice extraction, finely divided solids called argols become an integral part of the extracted juice as a result of cell rupture and breakup of fruit structure. Juice extracted from grapes contains sufficient quantities of these substances so that a large proportion of the tartrates and practically all of the argols separate from the juice upon prolonged standing to form an undesirable cake or precipitate in the bottom of the container.

In the interest of clarity, the term "tartrate," as used herein, refers to the salts of tartaric acid and the term "argols" refers to the various suspended solids present in grape juice. Further, the term "detartration" is herein employed to denote the two processes, crystallization of tartrates and agglomeration of argols and to the removal of these resulting solids from juice or concentrate.

Freshly prepared grape juice in its natural state comprises a supersaturated solution of tartrates, in particular potassium bitartrate, and these tartrates belong to a class of substances which very slowly crystallize from solution. As the condition of supersaturation continues for a prolonged period during which crystallization occurs to produce solids within the solution, it is apparent that in processing grape juice, a considerable time must be allowed for crystillization to reduce the proportion of dissolved tartrates to the point where only a saturated solution remains. Otherwise solid formation continues after the completion of processing, forming unsightly and undesirable sediment in the product. Additionally, argols are present in the juice in such finely divided form that they form a haze which settles out over a considerable period of time through direct settling of some of the largest particles and agglomeration of the smaller particles to form masses of sufficient size to settle or to be capable of ready removal. A substantial time is required for these argols to settle out naturally or to agglomerate into adequate size for removal as by filtration. In grape technology, the chief concern has been with methods and means for speeding crystallization of tartrates for same is much slower than agglomeration of argols; however, the present invention reduces the crystallization time to a small fraction of the period of natural agglomeration and in addition likewise reduces the latter so that normal settling periods are eliminated.

Current processes for detartration of grape juice consist of one of the three following methods. Freshly-expressed juice is pasteurized, filled into carboys and the carboys sealed, cooled and stored at or below ambient temperature for several months. During this time, tartrates and argols form a heavy precipitate in the bottom of the carboy. At the conclusion of the storage period, juice is racked off and suspended particles of argols and suspended tartrate crystals are removed by filtration. The second method is quite similar to the first, except that freshly prepared juice is cooled and stored under refrigeration in large tanks, from whence the juice is drawn off after several months' settling and then filtered. The third general method, usually called "rapid detartration," consists essentially of flash cooling of freshly expressd juice nearly to freezing temperature and holding at that temperature for a length of time (one to two days) sufficient to permit a substantial portion of incipient crystallization to take place. In any of these methods, it is necessary that sufficient tartrates be removed so that the resultant juice remains unsaturated with respect to tartrates at the lowest temperature that the juice is expected to encounter during storage and distribution. Otherwise subsequent crystallization would occur because of supersaturation at these temperatures.

As is evident from the foregoing, none of the presently employed methods for detartration of grape juice lend themselves to the continuous production of a finished single strength juice because of the extensive waiting period required in each case for crystallization and settling, and the resultant needless juice-holding capacity and process operating expense.

The advent of a large and expanding market for concentrates of these juices, particularly frozen Concord grape juice concentrate, has compounded the problem of tartrate removal. The solubility of tartrates in grape juices not only becomes less as the temperature is lowered, but due to juice concentration, decreases as the concentration of fruit solids is increased. Hence, tartrates crystallize out of solution both during and after concentration of juice, even though the juice had been previously detartrated by conventional methods. Crystallization during concentration, although ordinarily only a minor portion of the ultimate amount, create a severe operating problem in a plant. Crystals tend to form heavy crusts on surfaces within the evaporator system and cause frequent shutdowns for removal of these crusts, usually of the order of once every twenty-four hours of operation. Such crusts apparently are caused by the interior surfaces serving as focal points for the onset of crystallization, and crystals so formed serving as further focal points. The need for a lengthy holding period in cool storage for further tartrate crystallization after concentration, usually of a week or more, is an expensive and time-consuming interruption in the otherwise continuous process of frozen concentrate production, for it is necessary that sufficient crystallization has occurred so that crystal formation will not take place in the retail containers of blended and sweetened concentrate.

My invention provides a method of processing wherein the crystallization rate of tartrates and the agglomerization rate of argols are artificially accelerated to a rate hitherto unknown in the art. In addition, it provides a method for artificially controlling the average size of crystals so formed in order to obtain sizes most desirable for removal by centrifugation and filtration procedures. In accordance with my invention there is employed as a step in the processing of grape juice the application of supersonic or ultrasonic energy waves to the juice, these terms being herein used interchangeably.

The application of supersonic energy to a material results in the production of waves of mechanical vibratory energy, called supersonic waves, which are transmitted through the material by high frequency longitudinal movement of the molecules therein. In the present instance, the molecular motion produced by supersonic waves is utilized in three ways. First, it serves to overcome the reluctance of tartrates to crystallize from supersaturated solutions by providing focal points for the onset of crystallization. Second, the additional molecular collisions resulting from this motion speed up the growth of crystals already formed. Third, the increased number of collisions of particles of argols speed their agglomerization into aggregates of a size easily removable by ordinary filtration.

Accordingly, in the processing methods of the invention, operations are modified in order to bring about rapid and controlled tartrate crystallization and argol agglomerization by insertion into the conventional process the step comprising treatment of the juice or concentrate with supersonic waves. As crystallization and agglomerization both occur at a very rapid rate under these circumstances, the discrete particles so formed may be continuously removed by filtration or centrifugation and the juice or concentrate may be further processed without delay and without the potentiality of further tartrate crystallization at or above the treatment temperature. Furthermore, the particle size of the crystals and agglomerate may be controlled by duration of the supersonic treatment, and the intensity and frequency of the supersonic energy applied.

An important advantage of my invention lies in the elimination of costly and time-consuming delays in the processing of grape juice and grape juice concentrate and in the risks of microbial spoilage inherent in present methods of detartration. With this process, single strength grape juice may be processed directly from grapes to retail containers without the risk of later tartrate crystallization and argol settling. Likewise, concentrated grape juice may be packaged directly after supersonic treatment and crystal removal, or utilized directly in making such products as frozen grape juice concentrate for grape beverage without the customary waiting period for the development of tartrate crystals.

Accordingly, it is an object of the present invention to provide a continuous flow process for packing of single strength or concentrated grape juice products.

It is another object of the present invention to provide a method and means for rapidly reducing a supersaturated solution to a saturated solution by the application of supersonic energy waves thereto.

A further object of the present invention is to provide a process for the control of crystal growth wherein initial minute crystals are caused to grow to desired size by the application of supersonic energy thereto.

Yet another object of the present invention is to provide for the rapid crystallization of tartrates and the agglomeration of argols in grape juice by the application thereto of vibratory energy from a supersonic energy source.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

The invention is illustrated as to one embodiment thereof in connection with the attached drawings wherein:

Figure 1 is a flow diagram of a complete juice and juice concentration process.

Figure 2 is a flow diagram of an evaporation process herein applicable.

Considering the invention in relation to the arrangement illustrated in Figure 1 of the drawings there is indicated a receptacle arranged to contain grape juice produced as by the pressing of grapes, or by drawing off of free run juice from crushed grapes, or by other means. This juice is then passed through a supersonic generator 2 of any conventional type wherein supersonic energy waves or vibrations are passed through the juice either stationary or flowing. These waves cause accelerated crystallization and agglomeration in the juice whereby filterable particles form therein. The duration, power and frequency of supersonic treatment is such as to produce crystals and agglomerates of particle sizes most readily removable from the juice, as more fully hereinafter set forth. These particles so formed in generator 2 are then removed at a filter 3 by filtration with or without previous centrifugation as desired. The juice leaving the filter 3 is clear of haze tend and no longer supersaturated at the temperature thereof and this juice may be passed through an essence recovery unit if desired, to a vacuum evaporation system 6 or packaged from the filter as single strength juice. In continuing with the concentrate process, the juice is passed through the vacuum system 6, and such a system is represented in more detail in Figure 2. The juice enters the recirculating vacuum evaporation system 6 of Figure 2 at a concentrator body or vapor-liquid separator 7 wherein the juice mixes with the concentrate therein and the mixture or partially concentrated juice flows as by gravity or through a circulating pump 8 into a second supersonic generator 9 wherein further crystallization and agglomeration result. From the generator 9 the partially concentrated juice is passed through a heat exchanger 11 wherein heat is absorbed and the evaporation of water takes place. From the heat exchanger a mixture of liquid and vapor flows into the concentrator body 7 wherein the vapor is exhausted and the concentrated juice returned to the circulating pump 8 from whence concentrated juice is drawn.

As one of the more important techniques for minimizing operating problems in accordance with the invention, tartrate crystallization in the form of freely suspended crystals is induced by the insertion of an additional supersonic zone of treatment between the mass of liquid in the concentrator body and the point where the liquid enters the heat exchanger. By this technique, the extreme conditions of tartrate supersaturation normally present during concentration of grape juice are eliminated and hence, the tendency for crystallization at focal points on equipment surfaces is materially reduced, thereby preventing to a material extent, the formation of dense and firmly adhering coatings on these surfaces. Reduction in the rate of formation of this coating makes it possible to operate such equipment for greatly extended periods of time before a shutdown for cleaning is required. If desired, suspended crystals so formed may be continuously removed from the evaporative system by continuous centrifugation or filtration. With the aforesaid supersonic treatment in the evaporator system, the concentrated product is not supersaturated in respect to tartrates and no further crystallization will take place, provided the product is held at or above the temperature existing in the evaporative system.

Continuing with the process of concentration illustrated in Figure 1, ordinarily such products are to be further processed, packaged or stored at temperatures considerably lower than those in the evaporative system, and for this reason, further crystallization will occur due to the lowering of tartrate solubility as the temperature is dropped. According to my invention, further crystallization is precluded by removing the concentrate from the evaporator system to a cooler 12 and immediately cooling the concentrate to a temperature below that to which the concentrate may be later subjected while in the liquid state. The concentrate is then immediately passed through a zone of supersonic waves at supersonic generator 13, thereby reducing the tartrate concentration from that of a supersaturated to essentially that of a saturated condition at the treatment temperature. The tartrate crystals so formed are then separated from the liquid by conventional means of filtration or centrifugation at 14. The concentrated juice from centrifuge 14 may be stored, packaged or further passed through blending and sweetening tanks 16 before packaging.

The effectiveness of supersonic energy in inducing crystallization of potassium bitartrate from supersaturated solutions will be evident from the following test. Grape juice at 170° F. containing potassium bitartrate in excess of its solubility at 140° F. but unsaturated at 170° F. was distributed between three containers and the contents of each allowed to cool under the same conditions to 140° F. No visible signs of crystallization were apparent in any of the samples. One sample was subjected to a one second burst of supersonic energy (frequency equalled 1 megacycle) but otherwise undisturbed. Thereupon a cloud of minute potassium bitartrate crystals formed throughout the juice along the path of induced vibration. The cloud rapidly developed into crystals large enough to be separately distinguishable by eye and these larger crystals rapidly settled out, leaving a clear supernatant liquid. The control sample was subjected to the same set of physical movements, but without treatment with supersonic energy and showed no signs of crystal development. The remaining two containers were allowed to cool to 120° F. at which time a few distinct crystals were observable in the bottom of each container. One sample was subjected to a similar burst of supersonic energy whereupon a cloud of minute crystals formed in the clear juice. As before, the cloud rapidly changed into distinctively recognizable crystals which rapidly settled to the bottom of the container, leaving a clear supernatant liquid. The volume of the settled crystals was approximately three times that in the control and the weight approximately two and one-half times that in the control. Further experiments with the above solution showed that the ultimate size of crystals formed as a result of exposure to supersonic energy could be controlled by the duration and intensity of the treatment, as is clear from the following experiments. A ten second treatment at full power produced a final settled mass of minute crystals in the above solution when treated at a solution temperature of 140° F. However, an initial treatment of one second at full power followed by a ten second treatment at reduced power materially changed both the number of crystals formed and the size crystals in the final settled mass. Formation of new crystals essentially ceased during treatment at reduced power while growth of minute crystals already present took place at a greatly accelerated rate, the rate being approximately four times as fast as occurred after a one second treatment alone. Similar effects were obtained when aqueous solutions of potassium bitartrate were tested.

The application of my invention to the processing of grape products will be further clarified by the following examples. As will be understood, intensities, frequencies, areas of supersonic treatment and duration of supersonic treatment required in the examples described herein vary widely depending upon the physical characteristics of the material under treatment and upon the physical layout of the equipment being used. Also, conditions of supersonic treatment are affected to a greater or lesser degree by the variety of grape from which the juice was obtained, the nature and content of the soluble solids of the juice, its degree of concentration, its temperature, its velocity, the cross-section of the treatment area, the length of the treatment column and perhaps other factors. Hence, as the desired effects of crystallization and agglomerization may be obtained over a range of supersonic frequencies or at particular frequencies in the range from 20,000 cycles per second to materially higher than 10,000,000 cycles per second, depending on the above-listed variables, listing of frequency values in the following examples would be misleading rather than revealing.

*Example I*

Filtered red viniferous grape juice, obtained as free run juice from crushed grapes, is fed to a continuous evaporation system at a rate proportional to the removal of concentrated juice from the system. A supersonic generator is inserted in the gravity flow line of a gravity flow, rising film, external calandria type of evaporator in such a manner that the liquid passing through this line is subjected to supersonic waves in order to crystallize the supersaturated portion of the tartrates present in the liquid. As crystallization takes place in the liquid itself, the deposition of a firmly adhering tartrate coating on evaporator surfaces is materially lessened and the evaporation system is operated continuously for five days before shutting down for cleanout. Completed concentrate is continuously withdrawn from the system, continuously cooled to about 50° F. and continuously subjected to treatment in a similar zone of supersonic waves prior to centrifugation and packaging in 55 gallon drums for storage and shipment at ambient temperature.

*Example II*

Concord grape juice, direct from the juice press, is cooled to about 50° F. and continuously passed through a zone of supersonic waves. Larger crystals and large particles of insoluble solids are first removed by centrifugation and then a sparkling clarity achieved by removal of smaller crystals and agglomerated particles of argols through filtration, which requires the formation of particle diameters of approximately 2 microns or larger during the supersonic treatment. The sparkling juice is hot packed in containers for distribution and sale as single strength grape juice.

*Example III*

Concord grape juice, previously treated with a pectin degrading enzyme in crushed grape form and direct from the press, is passed through a zone of supersonic waves, centrifuged to remove larger crystals and large particles of insoluble solids and a sparkling clarity achieved by removal of smaller crystals and agglomerated argols through filtration. Sparkling juice is led to an essence recovery unit where volatile flavors are recovered for later incorporation into the concentrate and thence to a continuous vacuum evaporation system consisting of a forced circulation, external calandria type of evaporator. A suspersonic generator is inserted in the line between the vapor-liquid separator body and the calandria in order that all liquid being recirculated is subjected to supersonic waves. Completed concentrate being withdrawn from the evaporation system is continuously cooled to about 30° F., continuously passed through a zone of supersonic waves, centrifuged for removal of crystals and led directly to blending tanks where recovered essence, sugar and single strength juice produced by the method cited in Example II are added to produce the blend used in packing frozen grape juice concentrate.

What is claimed is:
1. In the processing of grape juice, the steps comprising cooling the juice to a temperature in the range of about 30° F. to 50° F., accelerating agglomeration of argols and crystallization of tartrates by passing through the cooled juice mechanically induced supersonic sound waves in the general range of 20,000 cycles per second to 10,000,000 cycles per second, and then removing such agglomerates and crystals from the juice producing a clear juice.

2. In the continuous processing of grape juice, the steps comprising continuously flowing the juice along a path, cooling the juice during the flow thereof to a temperature in the range of about 30° F. to 50° F., accelerating the crystallization of tartrates and agglomeration of argols by passing through the cooled flowing juice physically induced supersonic sound waves in the general range of 20,000 cycles per second to 10,000,000 cycles per second, and then removing such agglomerates and crystals from the flowing juice.

3. In a continuous evaporative concentration process for grape juice, the steps comprising continuously removing water from the juice during movement thereof and producing a concentrate, continuously cooling the concentrate to about 30° F., subjecting said cooled flowing concentrate to mechanically induced supersonic sound waves in the general range of 20,000 cycles per second to 10,000,000 cycles per second accelerating agglomeration of argols and crystallization of tartrates in said concentrate, and then removing such agglomerates and crystals from the flowing concentrate producing a clear concentrate.

4. In a continuous evaporative concentration process for grape juice, the steps comprising recirculating a flowing stream of juice through a vacuum evaporation system having a heat exchanger and a liquid-vapor separator, producing mechanically induced supersonic sound waves in said flowing juice during said recirculation, said sound waves being in the general range of 20,000 cycles per second to 10,000,00 cycles per second thereby accelerating agglomeration of argols and crystallization of tartrates in said juice, substantially continuously withdrawing concentrate from said stream, and then removing such agglomerates and tartrates from the concentrate producing a clear concentrated juice.

References Cited in the file of this patent

UNITED STATES PATENTS

| | | |
|---|---|---|
| 1,835,271 | Burke et al. | Dec. 8, 1931 |
| 2,086,891 | Bachmann et al. | July 13, 1937 |
| 2,088,585 | Chambers et al. | Aug. 3, 1937 |

OTHER REFERENCES

Journal Amer. Chem. Soc., vol. 49, December 1927, pp. 3086, 3087, 3088.